3,284,495
PROCESS FOR THE CONTINUOUS MANUFACTURE, PURIFICATION, AND ISOLATION OF LACTIC ACID

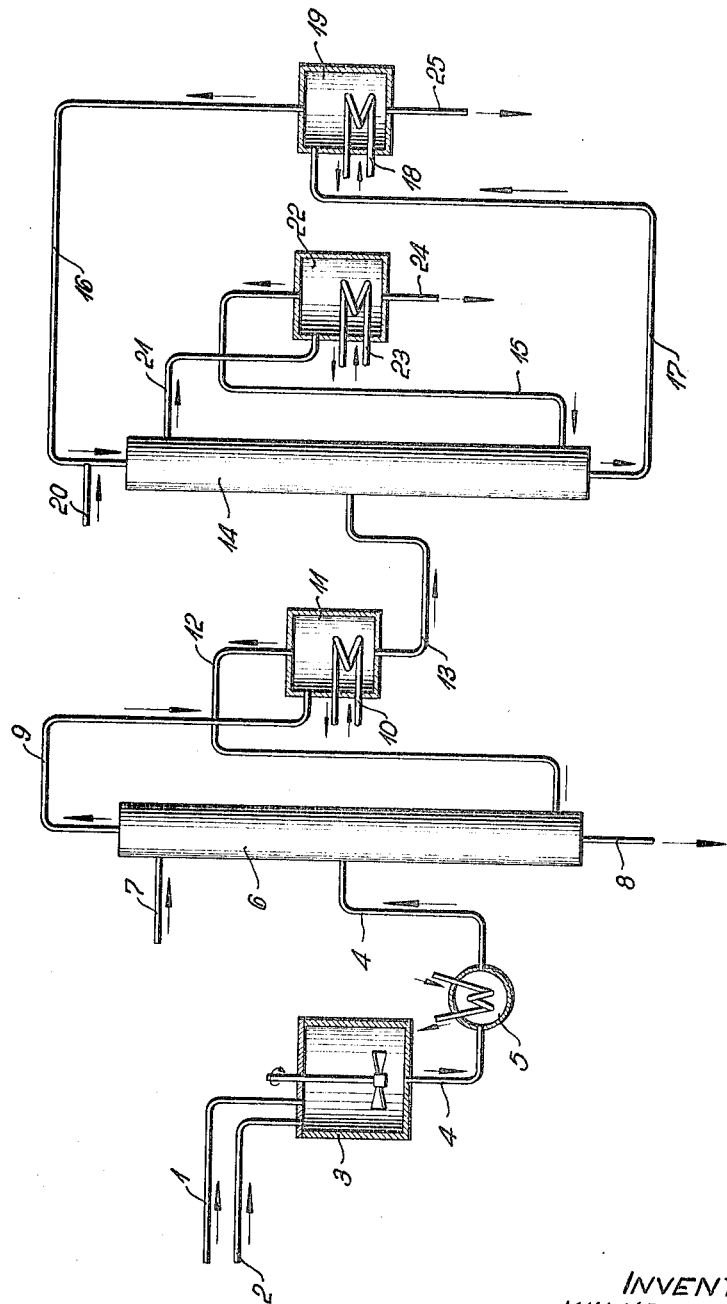

Wilhelm Vogt, Knapsack, near Cologne, Heinz Erpenbach, Surth, near Cologne, Herbert Joest, Cologne-Zollstock, and Lothar Strie, Knapsack, near Cologne, Germany, assignors to Knapsack-Griesheim Aktiengesellschaft, Knapsack, near Cologne, Germany, a corporation of Germany
Filed Apr. 11, 1963, Ser. No. 272,334
Claims priority, application Germany, Apr. 26, 1962, K 46,571
8 Claims. (Cl. 260—535)

The present invention relates to a process for the continuous manufacture, purification and isolation of lactic acid prepared by hydrolyzing lactic acid nitrile in an acid medium.

British Patent 300,040 describes a process wherein lactic acid nitrile is hydrolyzed in the presence of an acid, preferably hydrochloric acid and an inert organic solvent or a mixture of solvents, in which lactic acid nitrile and lactic acid are soluble while ammonium chloride is not, ammonium chloride is separated from the reaction mixture obtained by filtration, and lactic acid dissolved in the organic solvent is isolated by evaporating the solvent. The solvents used in this process include, for example, dioxane, diethylether, carbon tetrachloride, and chloroform. The lactic acid so produced is not pure but contains the organic byproducts which are formed simultaneously with the hydrolysis of lactic acid nitrile and the composition of which is not yet definitely known. These by-products are most likely condensation or polymerization products of acetaldehyde which is formed in minor amounts as a cleavage product of lactic acid during the hydrolysis reaction.

In the processes customarily used for purifying crude lactic acid, the acid is either distilled in vacuo with steam, or first transformed into a suitable salt which is then treated with a stronger acid and the lactic acid thereby liberated, and the lactic acid is extracted with an organic solvent. The steam distillation results in an incomplete purification of the crude lactic acid for the reason that the organic impurities often are also steam-distillable, whereas the transformation into lactates with the subsequent recovery of lactic acid therefrom involves considerable losses of lactic acid.

The present invention now provides a process which obviates the above-mentioned difficulties and enables lactic acid free from undesirable inorganic and organic by-products to be prepared in continuous manner.

The present invention provides more especially a process wherein lactic acid nitrile is hydrolyzed with at least the molar amount of a 50 to 70% sulfuric acid at a temperature of about 120 to 130° C. with the resultant formation of lactic acid, and the cooled reaction mixture is extracted in countercurrent manner in a first extraction column with an excess of isopropylether at a temperature within the range of about 20 to 30° C., organic constituents, such as lactic acid and small amounts of by-products being thereby separated from ammonium bisulfate. The extraction solution removed at the head of the extraction column is washed with a small quantity of water, the solvent is vaporized to remove possible salt-like impurities, the lactic acid-containing extract is introduced into the middle porton of a second extracting column and dissolved in twice the amount of isopropyl-ether, calculated on the amount of extract material, the isopropylether being introduced into the lower portion of the column. The upper portion of the column is simultaneously charged with an amount of water corresponding to at least 15% by weight of the ethereal solution so that the extract can be separated into an aqueous phase containing lactic acid on the one hand, and into an ethereal phase containing the undesired by-products on the other hand. The extraction temperature in the second extraction column is the same as in the first extraction column, i.e. within the range of from 20 to 20° C. The aqueous phase removed at the bottom of the second column is introduced into an evaporator and concentrated therein, from which pure lactic acid of about 90% strength and free from by-products can be removed after evaporation of the water.

The process of the present invention is more particularly carried out as follows: The lactic acid nitrile should be hydrolyzed with an about 55 to 60% sulfuric acid with a molar ratio of nitrile to sulfuric acid of about 1:1 to 1:1.5, preferably 1:1.1. Under these conditions, the hydrolysis is complete within 2 to 4 hours, generally after about 3 hours, at a hydrolysis temperature of about 120 to 130° C. The reaction mixture is cooled at about 20 to 30° C. before it enters the first extraction column, in which it is extracted, preferably at a temperature of about 22° C. For reasons of economy, it is advantageous to limit the excess of isopropylether which is necessary for extracting the reaction mixture to an amount 6 to 10 times, preferably 8 times, the amount by weight of the reaction mixture. The ethereal extraction solution which is obtained in the above indicated amounts is washed out before leaving the extraction column with an amount of water corresponding to about 5% by weight of the reaction mixture. The brine layer free from lactic acid which deposits on the bottom portion of the column and consists of ammonium bisulfate, water and a small proportion of sulfuric acid in excess is removed and disposed of.

The extraction solution removed from the first extraction column is vaporized in the usual manner in a vaporizer heated at about 80° C. In order to maintain the residue remaining after vaporization of the solvent in the thinly liquid state, it is advantageous to retain about 30% of the solvent in the residue, the solvent expelled being returned into the lower portion of the first extraction column.

In order reliably to separate the lactic acid in the second extraction column from undesired organic by-products, the solution to be extracted is advantageously contacted with a certain proportion of extracting agent. To this end, the extract introduced into the middle portion of the column is dissolved in isopropylether in the ratio of 1:1 to 1:2, preferably 1:1.5 and the resulting ethereal solution is extracted in counter-current manner with about 15% by weight water, calculated on the amount of the ethereal solution. The water is introduced into the upper portion of the column, whereas the isopropylether is introduced into its lower portion. The extraction is thus carried out in continuous manner. At the bottom portion of the column, the aqueous lactic acid-containing extract is removed and introduced into a vaporizer in which an amount 90% lactic acid concentrate is prepared and the water is expelled at a temperature of about 80–95° C. under a pressure of 200 to 300 mm. mercury, preferably 250 mm. mercury. The vaporized water is returned into the upper portion of the extracting column and used again as the extracting agent for the lactic acid. The organic phase flowing off at the head of the column is worked up in analogous manner and introduced into a further vaporizer wherein the solvent is recovered, the isopropylether being expelled at about 80° C. The organic impurities remaining as the residue in the vaporizer are removed and disposed of. The solvent expelled is introduced into the lower portion of the extraction column to dissolve the extract which is continuously supplied to the column.

The lactic acid prepared by the process of the present invention is free from undesired by-products and has a purity corresponding to the prescriptions as set forth in the German pharmacopeia (Deutsches Arzneibuch, 6th edition (DAB VI).

The following example illustrates the invention with reference to the annexed flow pattern.

*Example*

157.8 kg. lactic acid nitrile and 410 kg. sulfuric acid of 56% strength were introduced through lines 1 and 2 within 20 minutes into the steam-heated reactor 3 provided with a stirring means, and the reaction mixture was maintained for a further 160 minutes at a reaction temperature of 127° C. The reaction mixture removed at the bottom portion of reactor 3 through line 4 was cooled in cooler 5 to a temperature of about 20 to 30° C. and supplied to the middle portion of a first extraction column 6 which was simultaneously charged from below with about 8 times the amount by weight of isopropylether flowing through line 12. The ethereal solution of the organic constituents of the reaction mixture was washed before it left the column 6 with 28.4 kg. water and thereby freed from water-soluble impurities, the wash water being introduced into the upper portion of column 6 through line 7. The extraction column 6 was maintained at a tmperature of 22° C. A brine layer which was free from lactic acid, consisted of ammonium busulfate, water and a small amount of sulfuric acid in excess, and deposited in the bottom portion of column 6 was withdrawn through line 8 and disposed of. The ethereal extract of the reaction mixture flowing off at the head of column 6 was conveyed through line 9 into vaporizer 11 provided with a heating means 10, the still of which was maintained at a temperature of 80° C. The isopropylether expelled in vaporizer 11 was returned through line 12 into extraction column 6, whereas the vaporization residue, which consisted of lactic acid, organic by-products and about 30% isopropylether was introduced through line 13 into the middle portion of extraction column 14. The lactic acid was separated from the vaporization residue by introducing 418 kg. isopropylether through line 15 into the lower portion of extracting column 14 and by introducing 105 kg. water through line 16 into the upper portion of the column 14. The extraction temperature was at 22° C. as in the first column. Of the two phases which formed in the column, the lower aqueous phase contained all the lactic acid, whereas the upper ether phase contained the dissolved organic impurities. Pure aqueous lactic acid was removed at the bottom portion of column 14 which was supplied through line 17 to vaporizer 19 provided with a heating means 18 and concentrated therein. The water was vaporized at 83° C. under a pressure of 250 mm. mercury. The condensed off-steam was returned through line 16 into the upper portion of extraction column 14. Fresh water was supplied through line 20 and combined with the water of condensation circulating in line 16. The ethereal solution of the impurities withdrawn from the upper portion of extraction column 14 through line 21 was worked up in vaporizer 22 provided with a heating means 23 which maintained the still of the vaporizer at a temperature of 80° C. The isopropylether expelled in vaporizer 22 was introduced through cycle line 15 into the lower portion of column 14, whereas the vaporization residue was removed from the vaporizer through line 24. The lactic acid concentrated in vaporizer 19 had a total acid content of 94.4% by weight and a content of free lactic acid of 75.2% by weight, 216.7 kg. of acid, corresponding to a yield of 99.2%, calculated on the lactic acid nitrile used, were obtained. The lactic acid was obtained in the form of a clear, sirupy liquid having a specific gravity of 1.21. It was withdrawn from vaporizer 19 through line 25.

We claim:

1. A process for the continuous manufacture, purification and isolation of lactic acid, which comprises hydrolyzing lactic acid nitrile with at least the molar amount of a 50 to 70% sulfuric acid at a temperature within the range of about 120 to 130° C. and within 2 to 4 hours with the resulting formation of lactic acid; extracting the resulting and cooled reaction mixture and thereby separating organic constituents from ammonium bisulfate in a first extraction column at a temperature within the range of about 20 to 30% C. in counter-current with an excess of isopropylether; eliminating the resulting extraction solution from the head of the first extraction column, washing the extraction solution with a small amount of water and removing the solvent from the extraction solution by vaporization; introducing the resulting extract into the middle porion of a second extraction column maintained at the same temperature as the first extraction column; introducing about double the amount by weight of isopropylether, calculated on the amount of extract, into the lower portion of said second extraction column; introducing at least 15% by weight water, calculated on the amount of ethereal solution, into the upper portion of the said second extraction column; separating the extract into an aqueous lactic acid-containing phase and into an ethereal phase containing organic by-products; removing the aqueous phase at the bottom portion of the second extraction column; and vaporizing the water contained in said aqueous phase and thereby converting it into pure lactice acid of about 90% strength.

2. A process as claimed in claim 1, wherein the lactic acid is hydrolyzed with a 55 to 60% sulfuric acid in the molar ratio of 1:1 to 1:1.5.

3. A process as claimed in claim 1, wherein the reaction mixture is extracted in the first extraction column with about 6 to 10 times the amount by weight isopropylether, calculated on the reaction mixture.

4. A process as claimed in claim 1, wherein the ethereal extraction solution is washed within the first extraction column in counter-current manner with about 5% by weight water, calculated on the reaction mixture.

5. A process as claimed in claim 1, wherein the extraction solution removed from the first extraction column is vaporized at a temperature of about 80° C. to leave a residual content of solvent of about 30% and the solvent expelled is introduced into the lower portion of the first extraction column.

6. A process as claimed in claim 1, wherein the extract introduced into the second extraction column is dissolved in isopropylether in the ratio of 1:1 to 1:2, extracted in counter-current manner with water, and an ethereal solution of organic by-products is withdrawn from the upper portion of the column.

7. A process as claimed in claim 6, wherein the solvent of the ethereal solution of the organic by-products is vaporized and introduced in a cycle into the lower portion of the second extraction column.

8. A process as claimed in claim 1, wherein the aqueous lactic acid solution is concentrated at a temperature of about 80 to 95° C. and under a pressure of about 200 to 300 mm. mercury.

References Cited by the Examiner

UNITED STATES PATENTS 1,906,068   4/1933   Jenemann _____ 260—535

FOREIGN PATENTS 280,969   6/1928   Great Britain.
300,040   11/1928   Great Britain.

LORRAINE A. WEINBERGER, *Primary Examiner.*

LEON ZITVER, *Examiner.*

D. P. CLARKE, A. P. HALLUIN, *Assistant Examiners.*